G. BRUNTON.
DENTAL FLASK AND MEANS FOR CLOSING AND FASTENING THE PARTS THEREOF.
APPLICATION FILED JULY 20, 1912.

1,115,779.

Patented Nov. 3, 1914.
2 SHEETS—SHEET 1.

Witnesses
A. G. Porte
D. D. Wilson

Inventor
GEORGE BRUNTON,
By William S. Jones
Atty.

G. BRUNTON.
DENTAL FLASK AND MEANS FOR CLOSING AND FASTENING THE PARTS THEREOF.
APPLICATION FILED JULY 20, 1912.
1,115,779.
Patented Nov. 3, 1914.
2 SHEETS—SHEET 2.
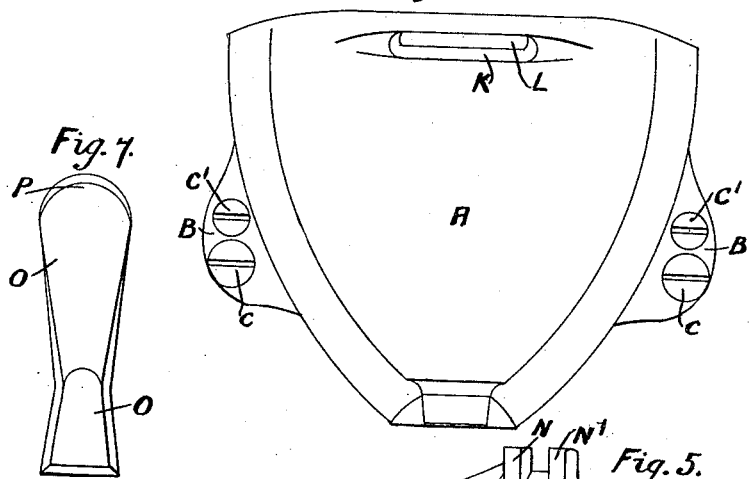
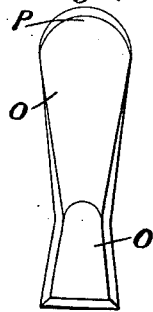
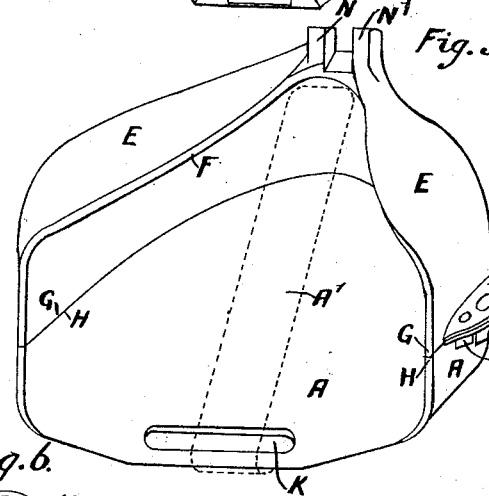
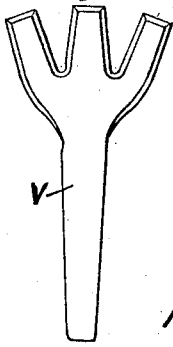
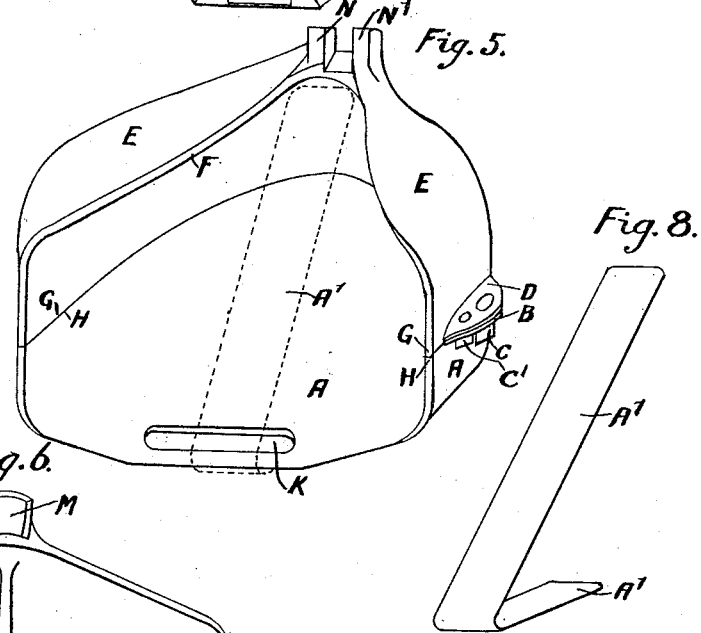
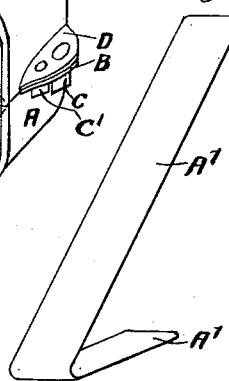
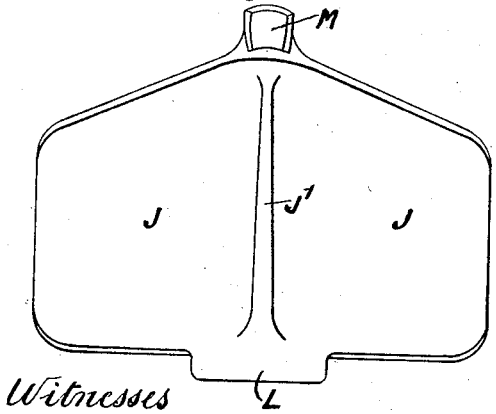
Witnesses
A. G. Ports
D. E. Wilson
Inventor
GEORGE BRUNTON
By William J. Donro
Atty.

UNITED STATES PATENT OFFICE.

GEORGE BRUNTON, OF LEEDS, ENGLAND.

DENTAL FLASK AND MEANS FOR CLOSING AND FASTENING THE PARTS THEREOF.

1,115,779.      Specification of Letters Patent.      Patented Nov. 3, 1914.

Application filed July 20, 1912. Serial No. 710,613.

*To all whom it may concern:*

Be it known that I, GEORGE BRUNTON, a subject of Great Britain, residing at No. 16 Blenheim Terrace, Leeds, in the county of York, England, have invented new and useful Improvements in or Connected with Dental Flasks and in Means for Closing and Fastening the Parts Thereof, of which the following is a specification.

This invention relates to certain improvements in or connected with dental flasks and in means for closing and fastening the assembled parts thereof.

According to my invention dental flasks are constructed for use as two or three part flasks, and an improved spring tension arrangement is provided for bringing together, closing and fastening the assembled and closure portions. The improved flasks, wherein the work is contained, is formed in two or three parts which are attachable and detachable in respect to each other by means of pins or dowels or the like loosely carried by external lips or projections, and screws, bolts or studs are used to fasten the parts together when assembled.

The actuating or closure portion consists of a semi-circular or horse-shoe arrangement of coiled or spiral spring attached to a bridge or cross piece, and has taking into it a screw bolt or thumb-screw.

The closure portion fits into a groove or notch and projection of one of the parts of the flasks, and the thumb-screw also engages in a boss or raised portion of another part of the flask.

By adjusting the screw-rod, or thumb-screw, the action of the spring tension or fastening device can be regulated to a nicety and without risk of disturbing or displacing any portion of the inside work.

Figure 1:
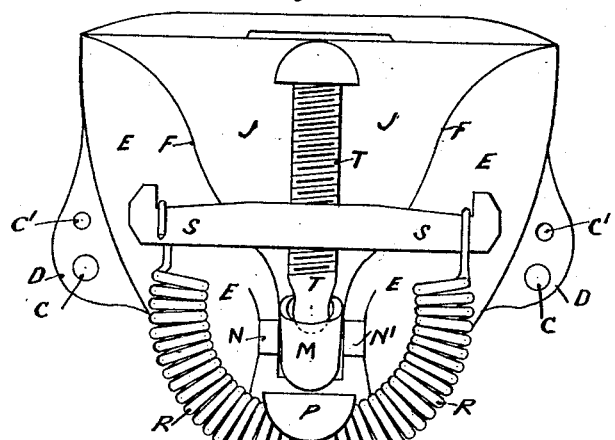
Figure 2:
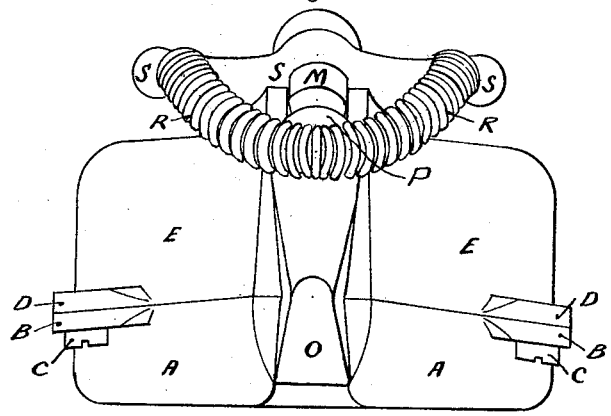
Figure 3:
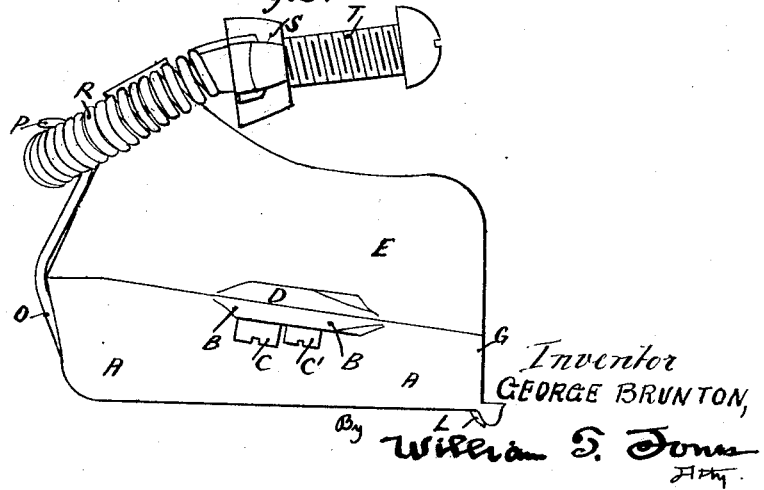

The accompanying drawings illustrate the invention. In these, Figure 1 is a plan looking on the top of the improved dental flask. Fig. 2 is a front elevation, and Fig. 3 is a side elevation thereof. Fig. 4 is a plan of the underside of the improved dental flask. Fig. 5 is a perspective view of the improved flask as seen at the back thereof with the loosely fitting or third part removed and guide dotted in position. Fig. 6 is a detail detached view of the loosely fitting or third part above referred to. Fig. 7 is a detail detached view of the loosely fitting yoke, and Fig. 8 is a detail view of the guide. Fig. 9 is a view of trident holder The improved flask consists *inter alia* of a lower part A in which the work is bedded. The part A has external lips or projections B which normally carry binding or tightening screws C taking into similar lips or projections D upon the upper part E of the flask when the part E is in its normal position upon the lower one. The lips are also provided with screwed in guide pins C' fitting suitable openings in the lip D. The part E has a diagonally or taper sided opening F and an open end G abuts upon an open end H of the part A. These openings are closed by means of a cover J so shaped as to follow the outline of the flask generally and to have a strengthening rib $J^1$ arranged centrally, which is shaped to adapt itself to the work after the guide has been removed. The cover J is fixed in position by its lug engaging a notch or slot K in the lower part A. The uppermost portion of the cover J ends in a boss or nose M adapted to fit between abutments N and $N^1$ upon the upper part E. At the front of the flask and in the lower part A thereof is a recess with V or taper edges adapted to receive the lower end of a yoke O which is shaped to the contour of the flask front and has a bent over lip P around which passes the spring R of the actuating or closure portion, the ends of which are secured to the cross piece or bridge S into which a screw-bolt or thumb-screw T takes centrally. The boss or nose M is cupped out or hollowed to receive the rounded or globular end of the member T.

The improved flask can be used on the three or two part method as required. The *modus operandi* for the three part method is to remove the binding screws, and then bed the work in the lower part A making use of a guide $A^1$ to indicate the height and position which the work will occupy relative to the upper part of the flask. The plaster is trimmed smooth and treated with parting liquid. The guide pins are screwed to place, the upper part E is placed in position, the binding screws tightened up and the plaster run in and trimmed in such a way that the cover J can be readily applied without interfering with the work inside. It is advisable that a piece of thin cardboard be placed in the slot between the abutments N and N¹ and under the nose or boss M. The purpose of this is to prevent the edges of the upper and lower parts of the flask sticking when the plaster is run in.

The two part method of using the improved flask is as follows:—The lower and upper parts A and E are screwed together, leaving out the guide pins, which are not wanted in this case. The work is bedded in plaster, care being taken to get the teeth under the flange of the upper part E. The cover J is fixed using the cardboard, and running in the plaster as before mentioned. When the plaster is quite hard in the three part method both the binding screws and guide pins must be removed, the flask placed in hot water, and when separated the wax is removed as ordinarily. If it is a gum block case now is time to lute the joints. There is no need to cover the joints with gold or tin-foil. The cover is now grooved with a half round tool all around the margin of the work about ⅛ inch deep, no gates are to be cut to connect this groove with the work or with the outside of the flask. The object is to let this so formed groove act as a drain or conduit into which surplus rubber will flow when it gets hot in the vulcanizer. Having got thus far, pressure, by the spring-shackle is applied fully on the work and the plaster, and thus keeps the work under pressure during vulcanizing and also during cooling, thus preventing deformation or change of form to a great extent and insuring a more correct fit. A polishing plate can be used by adapting a piece of tinfoil to the plaster surface of the cover J.

In flasking cases where the teeth or blocks are close down on the ridge it is well to pack the gum facing on the model before flasking. In this case the plaster is brought over the rubber up to the edge of the porcelain, as packing is done until the upper and lower parts are screwed together and the guide pins removed. The flask is now placed on the trident holder V which is simply a convenient support and which fits into a hole in the bench or what I call the bench pin and allows the flask to be placed at any angle. The flask is kept hot during the packing of the rubber by adjusting a small Bunsen burner underneath it and away from the hands of the workman. A small surplus of rubber is added over and above the sufficiency. There is no need to open the flask to see if too much rubber prevents it closing, or to put linen cloth over the rubber. The spring-shackle does the work of closing and fastening. The bite is never raised, teeth or blocks do not shift position, the simple or complicated work, combinations of metal and vulcanite, repairs, and the whole range of dental rubber work can be done more quickly and with greater accuracy than by the old method of flasking.

I claim:

1. The combination with a flask section carrying a projecting lip, of a second section provided with a portion to receive a screw end, a screw having its point engaging said portion, a bar having a threaded opening receiving said screw, and a coiled spring extending around said lip and having its ends connected to said bar.

2. The combination with a flask section carrying a projecting lip, of a second section provided with spaced lugs, a cover having a hollow boss fitting between said lugs, a screw having its point engaged in said boss, a bar threaded on said screw, and a coiled spring engaging said lip and having its ends connected to said bar.

GEORGE BRUNTON.

Witnesses:
WILLIAM REEVES,
CHARLES E. TAYLOR.